United States Patent
Chou et al.

(10) Patent No.: US 11,106,120 B2
(45) Date of Patent: Aug. 31, 2021

(54) PROJECTION DEVICE AND LIGHT SOURCE SYSTEM AND PROJECTION METHOD THEREOF

(71) Applicant: Coretronic Corporation, Hsin-Chu (TW)

(72) Inventors: Chen-Cheng Chou, Hsin-Chu (TW); Jeng-An Liao, Hsin-Chu (TW); Fu-Shun Kao, Hsin-Chu (TW); Hung-Lin Chen, Hsin-Chu (TW); Hsin-Chang Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 61 days.

(21) Appl. No.: 16/554,653

(22) Filed: Aug. 29, 2019

(65) Prior Publication Data
US 2020/0073221 A1 Mar. 5, 2020

(30) Foreign Application Priority Data

Aug. 30, 2018 (CN) .......................... 201811001120.8
Jun. 14, 2019 (CN) .......................... 201920894165.6

(51) Int. Cl.
G03B 21/20 (2006.01)

(52) U.S. Cl.
CPC ..... *G03B 21/2053* (2013.01); *G03B 21/2013* (2013.01); *G03B 21/2033* (2013.01)

(58) Field of Classification Search
CPC ............ G03B 21/2053; G03B 21/2013; G03B 21/2033; G03B 21/20; G03B 33/06;
(Continued)

(56) References Cited

U.S. PATENT DOCUMENTS

2005/0041000 A1\* 2/2005 Plut ........................ G09G 3/002
345/39
2008/0239297 A1 10/2008 Rueb et al.
(Continued)

FOREIGN PATENT DOCUMENTS

CN 101375207 2/2009
CN 101937161 1/2011
(Continued)

OTHER PUBLICATIONS

"Search Report of Europe Counterpart Application", dated Jan. 29, 2020, pp. 1-8.
"Office Action of China Counterpart Application", dated Mar. 3, 2021, p. 1-p. 12.
(Continued)

*Primary Examiner* — Michelle M Iacoletti
*Assistant Examiner* — Magda Cruz
(74) *Attorney, Agent, or Firm* — JCIPRNET

(57) ABSTRACT

A projection device, a light source system and a projection method thereof are provided. A portion of the light-emitting units are controlled to provide a light beam as the first light beam. It is detected whether characteristic parameters of the light-emitting units providing the light beam reach a preset value. When the preset value is not reached, the light-emitting units providing the light beam are disabled, and the remaining light-emitting units are controlled to provide the back-up light beam as the first light beam. A portion of the first light beam is converted into a second light beam. The first light beam of which the wavelength is not converted and the second light beam are combined to generate an illumination beam. The illumination beam is converted into an image beam. The image beam is converted into a projection beam.

19 Claims, 8 Drawing Sheets

(58) Field of Classification Search
CPC .............. G03B 21/206; G03B 21/2086; G03B 21/204; H04N 9/31; H04N 9/3158; H04N 9/3155; H04N 9/3161
See application file for complete search history.

(56) References Cited

U.S. PATENT DOCUMENTS

| | | | | |
|---|---|---|---|---|
| 2008/0298044 | A1* | 12/2008 | Chen | F21V 19/04 |
| | | | | 362/20 |
| 2010/0328632 | A1* | 12/2010 | Kurosaki | G03B 21/204 |
| | | | | 353/98 |
| 2011/0216321 | A1* | 9/2011 | Kuratomi | G03B 21/2013 |
| | | | | 356/432 |
| 2011/0261326 | A1* | 10/2011 | Wang | G03B 21/28 |
| | | | | 353/31 |
| 2012/0038892 | A1 | 2/2012 | Kurtz et al. | |
| 2012/0140185 | A1* | 6/2012 | Masuda | G03B 21/204 |
| | | | | 353/31 |
| 2014/0368798 | A1* | 12/2014 | Gyoten | G03B 21/204 |
| | | | | 353/85 |
| 2015/0029467 | A1* | 1/2015 | Sugiyama | G02B 6/0001 |
| | | | | 353/31 |

FOREIGN PATENT DOCUMENTS

| | | |
|---|---|---|
| CN | 102196219 | 9/2011 |
| CN | 202546339 | 11/2012 |
| CN | 209879242 | 12/2019 |
| EP | 2169964 | 3/2010 |
| TW | 200848660 | 12/2008 |
| WO | 2018141112 | 8/2018 |

\* cited by examiner

PROJECTION DEVICE AND LIGHT SOURCE SYSTEM AND PROJECTION METHOD THEREOF

CROSS-REFERENCE TO RELATED APPLICATION

This application claims the priority benefit of China application serial no. 201811001120.8, filed on Aug. 30, 2018 and serial no. 201920894165.6, filed on Jun. 14, 2019. The entirety of each of the above-mentioned patent applications is hereby incorporated by reference herein and made a part of this specification.

BACKGROUND OF THE DISCLOSURE

Field of the Disclosure

The disclosure relates to a display device, and more particularly to a projection device and a light source system and projection method thereof.

Description of Related Art

In recent years, projection devices which mainly use solid-state light source such as light-emitting diodes (LEDs) and laser diodes have become increasingly important on the market. Since a luminous efficiency of the laser diode is 20% higher than the light emitting diode, in order to overcome the limitation of the light source of the light emitting diode, a new technology has been gradually developed to excite phosphor powder with the laser light source to generate a pure color light source for projector. In addition, the laser projection device not only can use the laser light source to excite the phosphor powder to emit light, but also can directly use the laser as the illuminating source of projector, and has the advantage of adjusting the number of the light source according to the requirement for brightness, thereby achieving the requirements of projector with various brightness.

In general, the laser projector controls the laser module mostly by connecting all the laser diodes in the laser module in parallel to turn on or turn off the laser module. Therefore, when the service life of the laser module is ended, the entire set of laser module has to be replaced. For example, if the service life of a laser module is 10,000 hours, the light source needs to be replaced after the laser projector has been used after 10,000 hours. However, since the projector is often mounted on the ceiling, the replacement of the light source is inconvenient.

The information disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure were acknowledged by a person of ordinary skill in the art.

SUMMARY OF THE DISCLOSURE

The disclosure provides a projection device, a light source system and a projection method thereof, capable of prolonging the cycle time of replacing the laser light source, reducing the frequency of replacing the laser light source, and improving the convenience of using the projection device.

The objectives and advantages of the disclosure may be further understood in the technical features disclosed in the disclosure.

To achieve one or a part or all the objectives or other objectives, an embodiment of the disclosure provides a projection device including a laser light source, a control circuit, a wavelength conversion device, a light combining device, a light valve, and a projection lens. The laser light source provides a first beam, and the laser light source includes a plurality of light-emitting units. The control circuit is coupled to the laser light source, controls a portion of the light-emitting units to provide a light beam as the first light beam, and detects electrical characteristics of the light-emitting units providing the light beam. When characteristic parameters of the light-emitting units providing the light beam do not reach a preset value, the light-emitting units providing the light beam are disabled, and the remaining light-emitting units are controlled to provide a back-up light beam as the first light beam. The wavelength conversion device is disposed on a transmission path of the first light beam to convert a portion of the first light beam into a second light beam. The light combining device is disposed on a transmission path of the first light beam and the second light beam, and combines the first light beam of which the wavelength is not converted and the second light beam to generate an illumination beam. The light valve is disposed on a transmission path of the illumination beam and converts the illumination beam into an image beam. The projection lens is disposed on a transmission path of the image beam, and converts the image beam into a projection beam.

The disclosure also provides a light source system of a projection device, including a laser light source, a control circuit, a wavelength conversion device and a light combining device. The laser light source provides a first light beam, and the laser light source includes a plurality of light-emitting units. The control circuit is coupled to the laser light source, controls a portion of the light-emitting units to provide a light beam as the first light beam, and detects electrical characteristics of the light-emitting units providing the light beam. When a characteristic parameters of the light-emitting units providing the light beam do not reach a preset value, the light-emitting units providing the light beam are disabled, and the remaining light-emitting units are controlled to provide a back-up light beam as the first light beam. The wavelength conversion device is disposed on a transmission path of the first light beam to convert a portion of the first light beam into a second light beam. The light combining device is disposed on a transmission path of the first light beam and the second light beam, and combines the first light beam of which the wavelength is not converted and the second light beam to generate an illumination beam.

The disclosure also provides a projection method of a projection device. The laser light source of the projection device includes a plurality of light-emitting units, and the projection method of the projection device includes the following steps. A portion of the light-emitting units are controlled to provide a light beam as the first light beam. It is detected whether characteristic parameters of the light-emitting units providing the light beam reach a preset value. When the characteristic parameters of the light-emitting units providing the light beam do not reach the preset value, the light-emitting units providing the light beam are disabled, and the remaining light-emitting units are controlled to provide the back-up light beam as the first light beam. A portion of the first light beam is converted into a second light beam. An illumination beam is generated by combining the first light beam of which the wavelength is not converted and the second light beam. The illumination beam is converted into an image beam. The image beam is converted into a projection beam.

Based on the above, in the embodiment of the disclosure, when the characteristic parameter of the light-emitting unit providing the light beam does not reach the preset value, the light-emitting unit that provides the light beam is disabled, and the remaining light-emitting units are controlled to provide the back-up light beam as the first light beam provided by the laser light source. Therefore, the cycle time of replacing the laser light source may be prolonged, the frequency of replacing the laser light source may be reduced, and the use the projection device may be more convenient.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
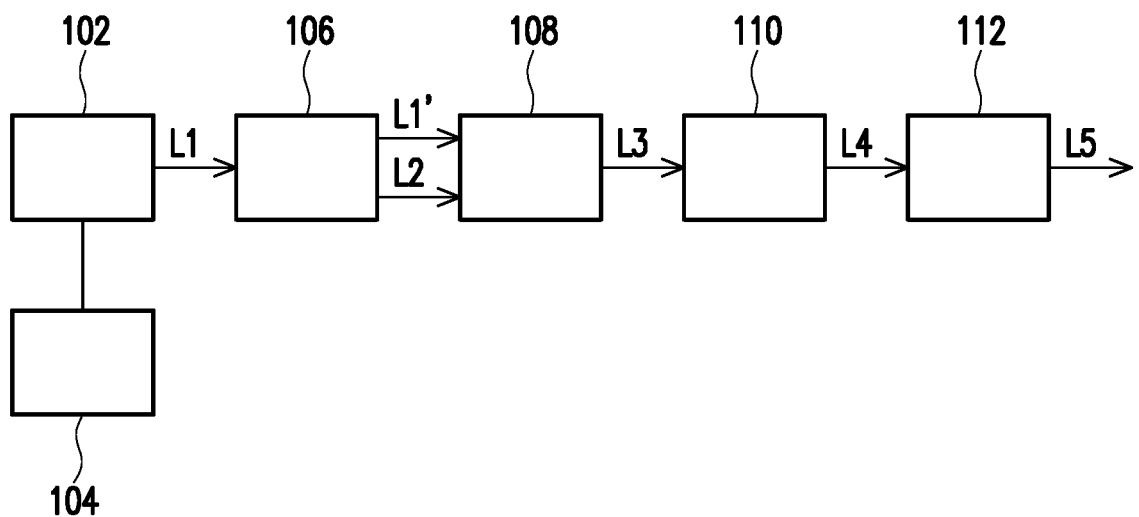
FIG. 1 is a schematic view of a projection device according to an embodiment of the disclosure.

FIG. 1 is a schematic view of a projection device according to an embodiment of the disclosure. Please refer to FIG. 1. The projection device 10 includes a light source system, a light valve 110, and a projection lens 112. The light source system includes a laser light source 102, a control circuit 104, a wavelength conversion device 106, and a light combining device 108. The control circuit 104 is coupled to the laser light source 102 that includes a plurality of light-emitting units (shown in FIG. 2). The laser light source 102 may be controlled by the control circuit 104 to provide a first light beam L1. Further, the control unit 104 controls a portion of the light-emitting units to provide a light beam as a first light beam L1. The wavelength conversion device 106 is disposed on the transmission path of the first light beam L1 to convert a portion of the first light beam L1 into a second light beam L2, and another portion of the first light beam L1 the wavelength of which is not converted but directly passes through the wavelength conversion device 106 or reflected by the wavelength conversion device 106; the wavelength conversion device 106 may be, for example, a phosphor wheel, but not limited thereto. As far as persons skilled in the art know, in the case that the wavelength conversion device 106 is a phosphor wheel, the first light beam L1 is incident into different position of the phosphor wheel when the phosphor wheel rotates. To be specific, the phosphor wheel (i.e. the wavelength conversion device 106) comprises at least two regions. For example, the phosphor wheel comprises a first region and a second region. The first region comprises phosphor material adapted to convert the first light beam L1 into the second light beam L2. The second region is configured with a transmissive element (such as glass plate) or a reflective plate, or formed with a reflective layer, for example, coated with a reflective layer, but not limited thereto.

Therefore, the portion of first light beam L1 stated above indicates the first light beam L1 irradiating the first region of the wavelength conversion device 106, and the phosphor material of the first region of the wavelength conversion device 106 converts the first light beam L1 into the second light beam L2. The another portion of the first light beam L1 stated above indicates the first light beam L1 irradiating the second region of the wavelength conversion device 106, such that the first light beam L1 can directly pass through the second region of the wavelength conversion device 106, or the first light beam L1 can be reflected by the second region of the wavelength conversion device 106. The so-called first light beam L1 irradiating the second region of the wavelength conversion device 106 is the first light beam L1' the wavelength of which is not converted stated in the following contents.

The light combining device 108 is disposed on the transmission path of the first light beam L1 and the second light beam L2, and combines the first light beam L1' the wavelength of which is not converted and the second light beam L2 to generate the illumination beam L3.

The light valve 110 is disposed on the transmission path of the illumination beam L3, and converts the illumination beam L3 into an image beam L4, wherein the light valve 110 may be, for example, a digital micro-mirror device (DMD), a liquid-crystal-on-silicon panel (LCOS panel), or a transmissive liquid crystal panel, but not limited thereto. The projection lens 112 is disposed on the transmission path of the image beam L4, and converts the image beam L4 into a projection beam L5 that is projected onto a projection screen (not shown) to form an image frame.

Specifically, the control circuit 104 may detect electrical characteristics (such as voltage signals or current signals) of the light-emitting units that provide the light beam, for example, detecting the magnitude of the current flowing through the light-emitting unit to determine the operating state of the light-emitting unit. When the characteristic parameter of the light-emitting unit that provides the light beam does not reach the preset value, for example, when the current flowing through the light-emitting unit suddenly becomes smaller than the preset value, it means that the service life of light-emitting unit may have reached the end and thus the light-emitting brightness is attenuated. On this occasion, the control circuit 104 may disable the light-emitting unit that provides the light beam, and control the remaining light-emitting units that do not provide the light beam to start providing the back-up light beam as the first light beam L1 to ensure that the characteristic parameters of the light-emitting units providing the light beam conform to the regulations, such that the laser light source 102 can continuously and stably provide the first light beam L1 that meets the projection requirements. In this manner, by enabling the back-up light-emitting unit in the laser light source 102, the cycle time of replacing the laser light source may be prolonged, and the frequency of replacing the laser light source may be reduced, thereby making it more convenient in using the projection device 10.

It should be noted that in some embodiments, the control circuit 104 not only determines the operating state of the light-emitting unit by detecting the electrical characteristics of the light-emitting unit that provides the light beam, but also determines the operating state of the light-emitting unit by counting the use time of the light-emitting unit. When the use time of the light-emitting unit exceeds the preset time length, the light-emitting unit that provides the light beam is disabled, and the remaining light-emitting units that originally do not provide the light beam start to provide the back-up light beam as the first light beam L1. In addition, in other embodiments, the control circuit 104 may also choose not to disable the light-emitting unit that originally provides the light beam, while simultaneously enabling other light-emitting units that originally do not provide the light beam to provide a light beam together to make the first light beam L1 to meet the projection requirements.

Figure 2:
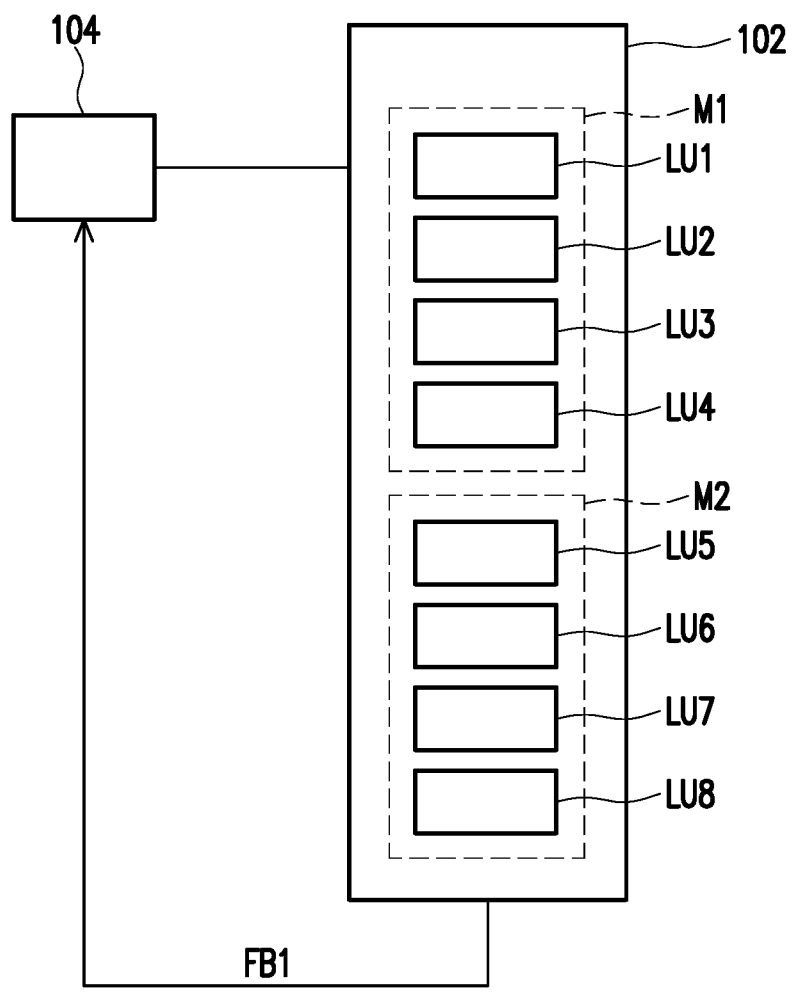
FIG. 2 is a schematic view of a laser light source and a control circuit of a projection device according to an embodiment of the disclosure.
Figure 3A:
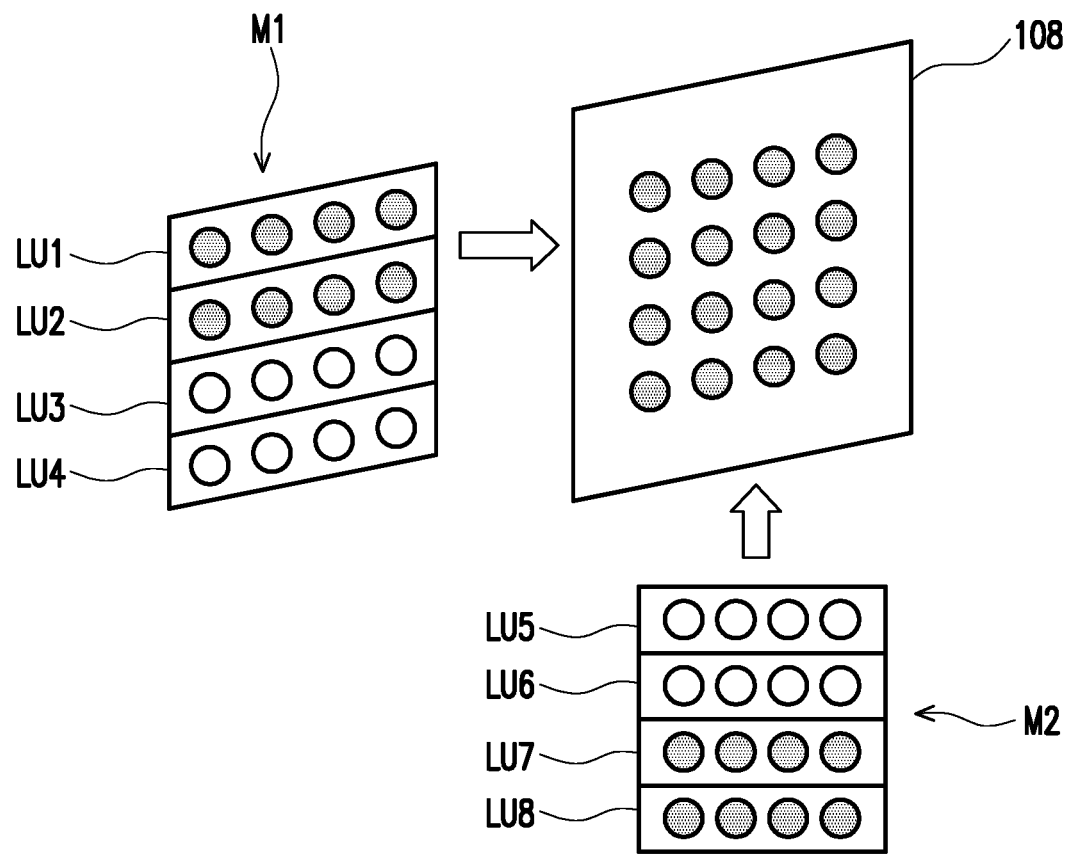
FIG. 3A is a schematic view of enabling a light source module according to an embodiment of the disclosure.

FIG. 2 is a schematic view of a laser light source and a control circuit of a projection device according to an embodiment of the disclosure. Further, the laser light source 102 may include a first light source module M1 and a second light source module M2 coupled to the control circuit 104. In this embodiment, the first light source module M1 includes a plurality of first light-emitting units LU1~LU4, the second light source module M2 includes a plurality of second light-emitting units LU5~LU8, wherein one light source module may include, for example, a laser diode bank, and one light-emitting unit may include, for example, a laser diode channel, but not limited thereto. The control circuit 104 may enable a portion of the first light-emitting units of the first light source module M1 and a portion of the second light-emitting units of the second light source module M2 to provide a light beam as the first light beam L1. For example, FIG. 3A is a schematic view of enabling a light source module according to an embodiment of the disclosure. In FIG. 3A, the control circuit 104 may enable the first light-emitting units LU1 and LU2 in the first light source module M1 and enable the second light-emitting units LU7 and LU8 in the second light source module M2 to provide a light beam as the first light beam L1.

The control circuit 104 may determine whether the characteristic parameter of the light-emitting unit that provides the light beam reaches a preset value according to the voltage or current feedback signal FB1 from the light-emitting unit that provides the light beam, for example, determining whether the characteristic parameter of the light-emitting unit that provides light beam reaches the preset value according to the magnitude of the current flowing through the light-emitting unit. When the characteristic parameters of the first light-emitting units LU1, LU2 and the second light-emitting units LU7, LU8 that provide the light beam do not reach the preset value, the control circuit 104 may disable the first light-emitting units LU1, LU2 and the second light-emitting units LU7, LU8 that provide the light beam, and control the remaining first light-emitting units LU3, LU4 and the remaining second light-emitting units LU5, LU6 to provide the back-up light beam as the first light beam L1.

It should be noted that the number and position of the light spots generated by the light beam incident into the light combining device 108 and provided by the first light-emitting units LU1, LU2 and the second light-emitting units LU7, LU8 are the same as the number and position of the light spots generated by the back-up light beam incident into the light combining device 108 and provided by the first light-emitting units LU3, LU4 and the second light-emitting units LU5, LU6. For example, in FIG. 3A, before and after switching the first light-emitting unit and the second light-emitting unit that provide the first light beam L1, the light-combining device 108 includes 16 light spots the positions of which are not changed, thereby ensuring that the laser light source 102 can provide the first light beam L1 with similar or identical optical characteristics before and after switching the first light-emitting unit and the second light-emitting unit that provide the first light beam L1, such that the first light beam L1 meets the projection requirement.

Figure 3B:
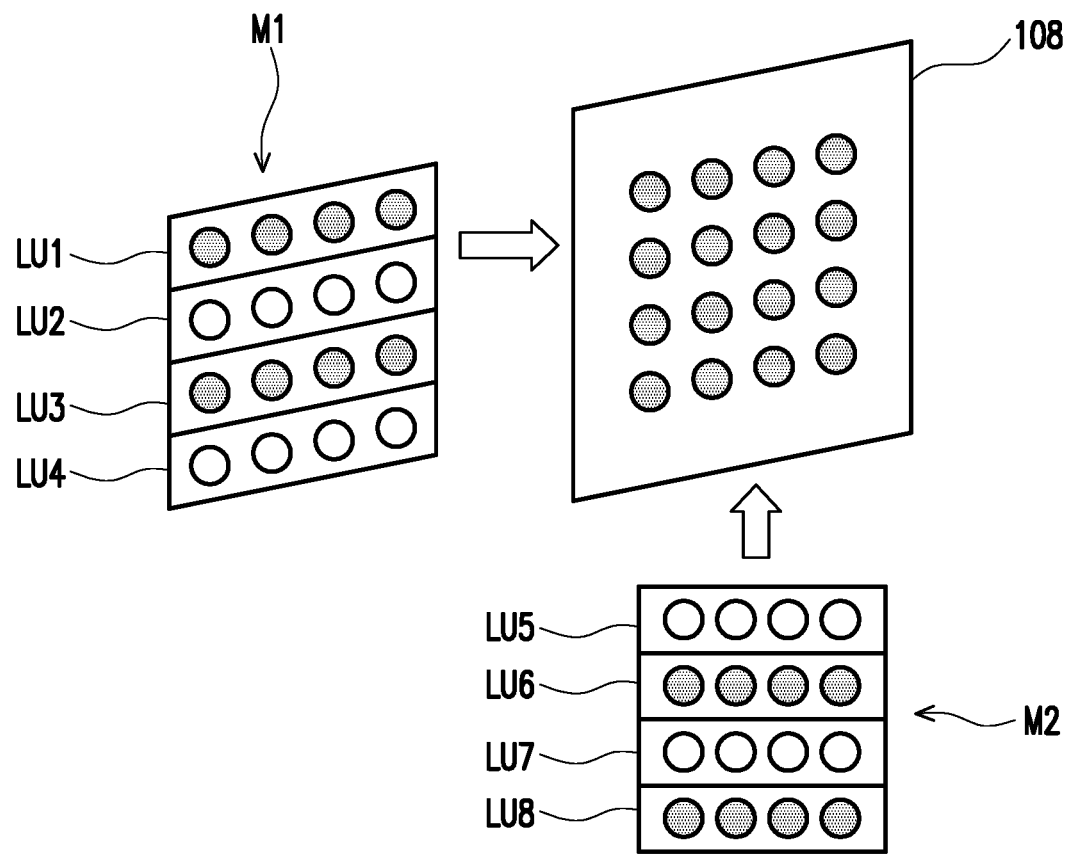
FIG. 3B is a schematic view of enabling a light source module according to another embodiment of the disclosure.

In addition, the configuration of the first light-emitting unit and the second light-emitting unit that initially provide the light beam is not limited to the embodiment of FIG. 3A. For example, in the embodiment of FIG. 3B, the control circuit 104 may also control the first light-emitting units LU1, LU3 and the second light-emitting units LU6, LU8 to serve as the light-emitting units that initially provide light beams, and then enable the first light-emitting units LU2, LU4 and the second light-emitting units LU5, LU7 to serve as the light-emitting units that provide the back-up light beams. That is, as long as the configuration of the light-emitting unit allows the laser light source 102 to provide the first light beam L1 having similar or identical optical characteristics before and after switching the first light-emitting unit and the second light-emitting unit that provide the first light beam L1, such configuration may be adopted for the light-emitting units.

In other embodiments, the control circuit 104 may also control and enable all of the light-emitting units (first light-emitting units LU1-LU4) of the first light source module M1 to provide a light beam as the first light beam L1. When the characteristic parameters of the first light-emitting units LU1~LU4 providing the light beam do not reach the preset value, the first light-emitting units LU1~LU4 are disabled, and then all of the light-emitting units (second light-emitting units LU5~LU7) in the second light source module M2 are enabled to serve as the light-emitting unit providing the back-up light beam. However, the driving method of driving all of the light-emitting units of the light source module to emit light leads to greater power consumption than the driving method of driving only a portion of the light-emitting units in the light source module.

In addition, in some embodiments, when the characteristic parameter of the light-emitting unit that provides the light beam does not reach the preset value, the control circuit 104 may also control the projection device 10 to project and display the light source selection interface to remind the user that the service life of the light-emitting unit has reached the end, and allow the user to select the light-emitting unit that provides the light beam. The control circuit 104 may disable the light-emitting unit that provides the light beam according to the light source selection command corresponding to the operation selected by the user, and control the remaining light-emitting units to provide the back-up light beam as the first light beam L1, such that the control of the light source system is more flexible.

Figure 4:
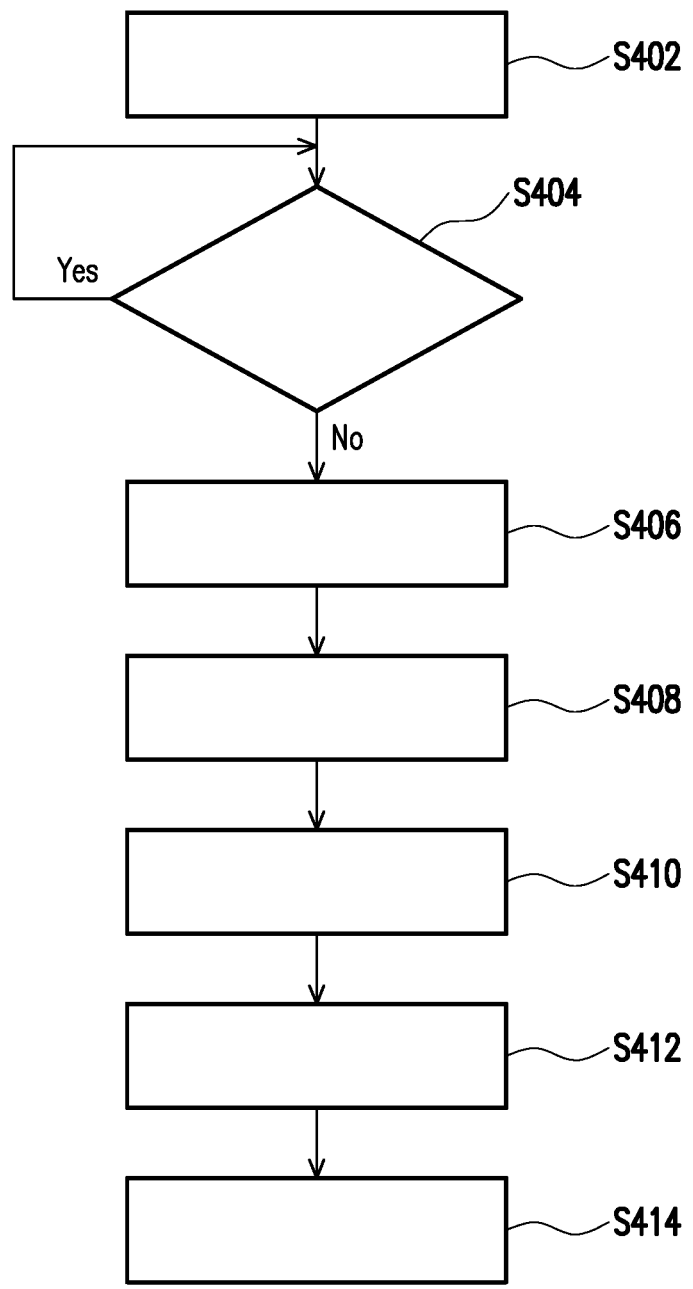
FIG. 4 is a flow chart of a projection method of a projection device according to an embodiment of the disclosure.

FIG. 4 is a flow chart of a projection method of a projection device according to an embodiment of the disclosure. As can be seen from the above embodiments, the projection method of the projection device may at least include the following steps. First, a portion of the light-emitting units are controlled to provide a light beam as a first light beam (step S402). Next, it is detected whether the characteristic parameter of the light-emitting unit providing the light beam reaches a preset value (step S404), for example, determining whether the characteristic parameter of the light-emitting unit providing the light beam reaches a preset value according to the voltage or current feedback signal from the light-emitting unit providing the light beam. If the characteristic parameter of the light-emitting unit providing the light beam reaches a preset value, for example, when the current flowing through the light-emitting unit is greater than the preset current value, it means that the light intensity provided by the light-emitting unit still meets the projection requirement, and the process may return to step S404 to continue detecting whether the characteristic parameter of the light-emitting unit providing the light beam reaches a preset value. On the other hand, if the characteristic parameter of the light-emitting unit providing the light beam does not reach the preset value, the light-emitting units providing the light beam is disabled, and the remaining portion light-emitting units are controlled to provide the back-up light beam as the first light beam (step S406). Thereafter, a portion of the first light beam is further converted into a second light beam (step S408), wherein the number and position of the light spots generated by the original light beam incident into the light combining device are the same as the number and position of the light spots generated by the back-up light beam incident into the light combining device. Then, combining the first light beam of which the wavelength is not converted and the second light beam to generate an illumination beam (step S410), the illumination beam is converted into an image beam (step S412), and finally the image beam is converted into a projection beam (step S414). In this manner, by enabling the back-up light-emitting unit in the laser light source, the cycle time of replacing the laser light source may be prolonged, the frequency of replacing the laser light source may be reduced, and the use of the projection device may be more convenient.

Figure 5:
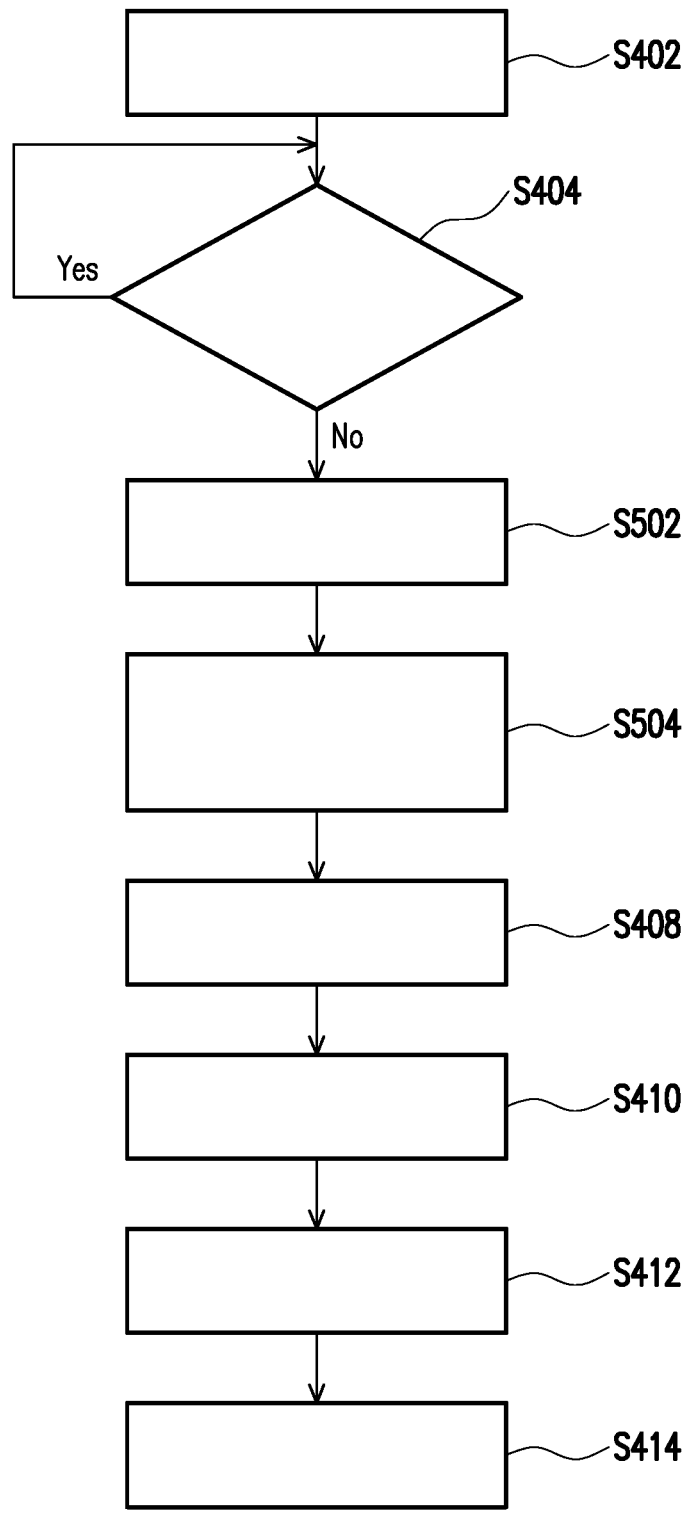
FIG. 5 is a flow chart of a projection method of a projection device according to another embodiment of the disclosure.

FIG. 5 is a flow chart of a projection method of a projection device according to another embodiment of the disclosure. The difference between the projection method of the embodiment of FIG. 5 and the projection method of the embodiment of FIG. 4 is that, in the embodiment of FIG. 5, when it is detected that the characteristic parameter of the light-emitting unit providing the light beam does not reach the preset value, the projection device may be controlled first to project and display the light source selection interface (step S502) to remind the user that the service life of the light-emitting unit has reached the end, and allow the user to select the light-emitting unit that provides the light beam. Then, the light-emitting unit providing the light beam is disabled according to the light source selection command corresponding to the operation selected by the user, and the remaining light-emitting units are controlled to provide the back-up light beam as the first light beam (step S504), and then the step S408 to S414 are performed, such that the control of the light source system is more flexible.

Figure 6:
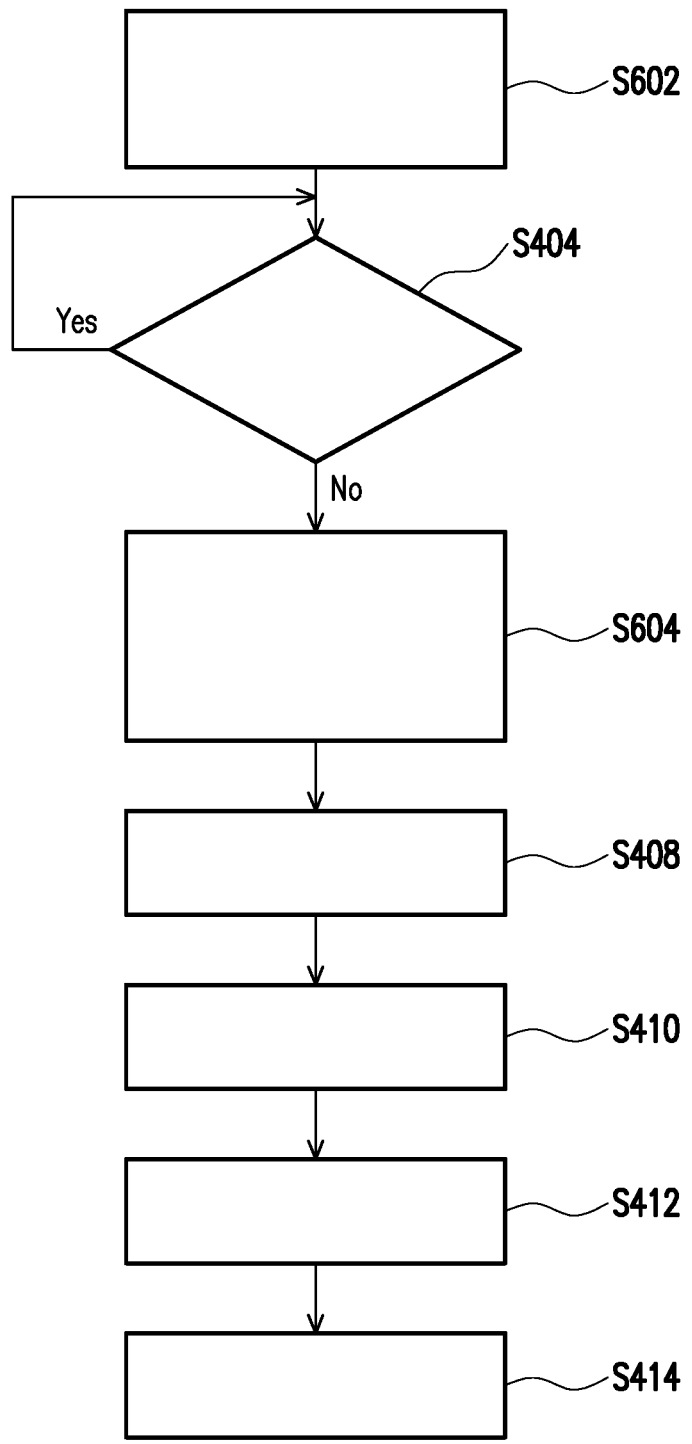
FIG. 6 is a flow chart of a projection method of a projection device according to still another embodiment of the disclosure.

FIG. 6 is a flow chart of a projection method of a projection device according to still another embodiment of the disclosure. The difference between the projection method of the embodiment of FIG. 6 and the projection method of the embodiment of FIG. 4 is that, in the embodiment of FIG. 6, the laser light source includes a first light source module and a second light source module, and the first light source module includes a plurality of first light-emitting units, and the second light source module includes a plurality of second light-emitting units. In this embodiment, a portion the first light-emitting units of the first light source module and a portion of the second light-emitting units of the second light source module are enabled first to provide a light beam as the first light beam (step S602). Then, it is detected whether the characteristic parameter of the light-emitting unit providing the light beam reaches a preset value (step S404). If the characteristic parameter of the light-emitting unit that provides s the light beam reaches a preset value, returning to step S404 to continue detecting whether the characteristic parameter of the light-emitting unit providing the light beam reaches a preset value. If the characteristic parameter of the light-emitting unit that provides the light beam does not reach the preset value, the first light-emitting unit and the second light-emitting unit that provide the light beam are disabled, and the remaining first light-emitting units and the remaining second light-emitting units are controlled to provide the back-up light beam as the first light beam (step S604), then steps S408 to S414 are performed subsequently.

Figure 7:
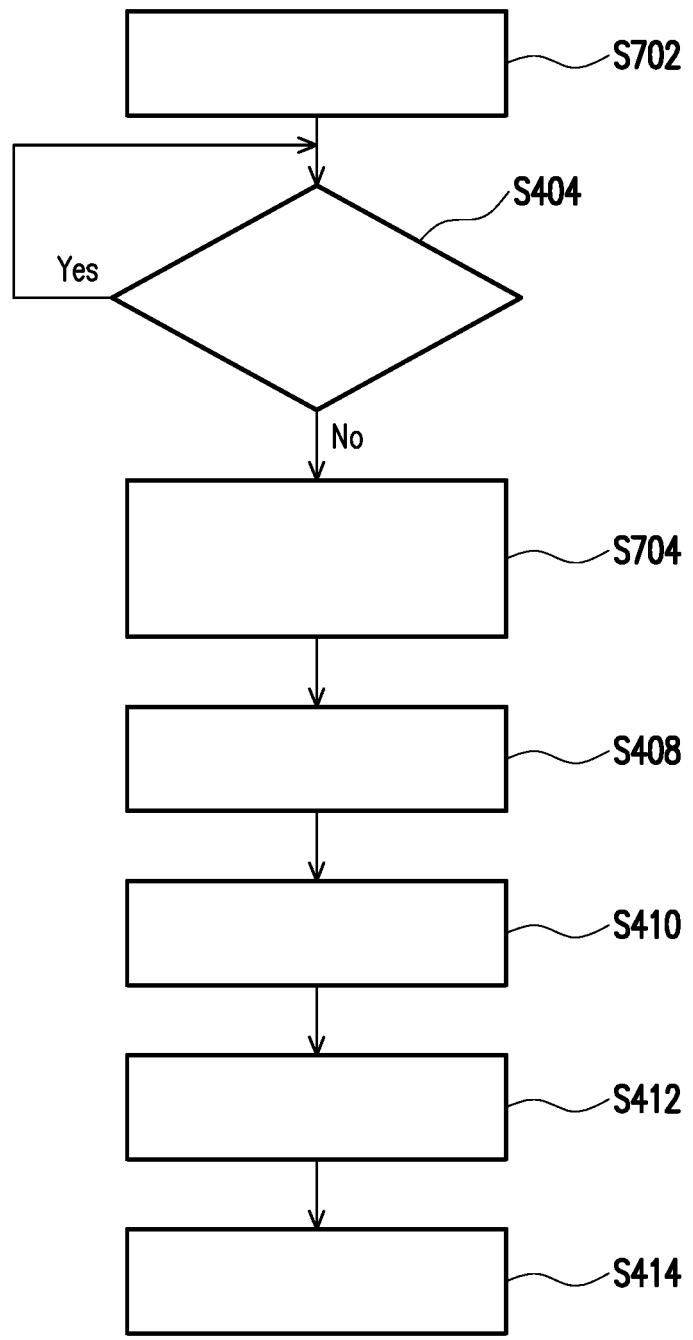
FIG. 7 is a flow chart of a projection method of a projection device according to yet another embodiment of the disclosure.

FIG. 7 is a flow chart of a projection method of a projection device according to yet another embodiment of the disclosure. The difference between the projection method of the embodiment of FIG. 7 and the projection method of the embodiment of FIG. 6 is that, in the embodiment of FIG. 7, all of the light-emitting units (first light-emitting units) in the first light source module are enabled to provide a light beam as the first light beam (step S702). Then, it is detected whether the characteristic parameter of the light-emitting unit that provides the light beam reaches a preset value (step S404). If the characteristic parameter of the light-emitting unit that provides the light beam reaches a preset value, returning to step S404 to continue detecting whether the characteristic parameter of the light-emitting unit providing the light beam reaches the preset value. If the characteristic parameter of the light-emitting unit that provides the light beam does not reach the preset value, the first light-emitting unit that provides the light beam is disabled, and all of the light-emitting units (second light-emitting units) in the second light source module are enabled to provide the back-up light beam as the first light beam (step S704), and then steps S408 to S414 are performed subsequently.

In summary, the embodiment of the disclosure disables the light-emitting unit that provides the light beam when the characteristic parameter of the light-emitting unit that provides the light beam does not reach the preset value, and controls the remaining light-emitting units to provide the back-up light beam as the first light beam provided by the laser light source. In this manner, the cycle time of replacing the laser light source may be prolonged, the frequency of replacing the laser light source may be decreased, and the use of the projection device may be more convenient.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, comprising:
    a laser light source, providing a first light beam, and comprising a plurality of light-emitting units;
    a control circuit, coupled to the laser light source, controlling a portion of the plurality of light-emitting units to provide a light beam as the first light beam, and detecting electrical characteristics of the plurality of light-emitting units providing the light beam, when characteristic parameters of the plurality of light-emitting units providing the light beam do not reach a preset value, disabling the plurality of light-emitting units providing the light beam, and controlling the remaining light-emitting units to provide a back-up light beam as the first light beam so as to substitute the disabled plurality of light-emitting units;
    a wavelength conversion device, disposed on a transmission path of the first light beam, and converting a portion of the first light beam into a second light beam;
    a light combining device, disposed on a transmission path of the first light beam and the second light beam, and combining the first light beam of which the wavelength is not converted and the second light beam to generate an illumination beam;
    a light valve, disposed on a transmission path of the illumination beam to convert the illumination beam into an image beam; and
    a projection lens, disposed on a transmission path of the image beam, converting the image beam into a projection beam.

2. The projection device according to claim 1, wherein the laser light source comprises:
    a first light source module, coupled to the control circuit, and comprising a plurality of first light-emitting units; and
    a second light source module, coupled to the control circuit, and comprising a plurality of second light-emitting units, wherein the control circuit enables a portion of the plurality of first light-emitting units of the first light source module and a portion of the plurality of second light-emitting units of the second light source module to provide the light beam as the first light beam, when characteristic parameters of the plurality of first light-emitting units and the plurality of second light-emitting units providing the light beam do not reach the preset value, the control circuit disables the plurality of first light-emitting units and the plurality of second light-emitting units providing the light beam, and controls the remaining plurality of first light-emitting units and the remaining plurality of second light-emitting units to provide the back-up light beam as the first light beam.

3. The projection device according to claim 1, wherein the laser light source comprises:
    a first light source module, coupled to the control circuit, and comprising a plurality of first light-emitting units; and
    a second light source module, coupled to the control circuit, and comprising a plurality of second light-emitting units, wherein the control circuit enables the plurality of first light-emitting units to provide the light beam as the first light beam, when characteristic parameters of the plurality of first light-emitting units providing the light beam do not reach the preset value, the control circuit disables the plurality of first light-emitting units, and enables the plurality of second light-emitting units to provide the back-up light beam.

4. The projection device according to claim 1, wherein the number and position of light spots generated by the light beam as the first light beam incident into the light combining device are the same as the number and position of light spots generated by the back-up light beam as the first light beam incident into the light combining device.

5. The projection device according to claim 1, wherein the control circuit determines whether characteristic parameters of the plurality of light-emitting units providing the first light beam reach the preset value according to a voltage or a current feedback signal from the plurality of light-emitting units providing the first light beam.

6. The projection device according to claim 1, wherein when characteristic parameters of the plurality of light-emitting units providing the light beam as the first light beam do not reach the preset value, the control circuit further controls the projection device to project and display a light source selection interface, the control circuit disables the plurality of light-emitting units providing the light beam as the first light beam according to a light source selection command, and controls the remaining light-emitting units to provide the back-up light beam as the first light beam.

7. The projection device according to claim 1, wherein the wavelength conversion device comprises a first region and a second region, the first region comprises a phosphor material, when the first region is irradiated by the first light beam, the phosphor material is adapted to convert the first light beam into the second light beam, and when the second region is irradiated by the first light beam, the first light beam passes through the second region, or the first light beam is reflected by the second region.

8. A light source system of a projection device, comprising:
   a laser light source, providing a first light beam, and comprising a plurality of light-emitting units;
   a control circuit, coupled to the laser light source, controlling a portion of the plurality of light-emitting units to provide a light beam as the first light beam, and detecting electrical characteristics of the plurality of light-emitting units providing the light beam, when characteristic parameters of the plurality of light-emitting units providing the light beam do not reach a preset value, disabling the plurality of light-emitting units providing the light beam, and controlling the remaining light-emitting units to provide a back-up light beam as the first light beam so as to substitute the disabled plurality of light-emitting units;
   a wavelength conversion device, disposed on a transmission path of the first light, and converting a portion of the first light beam into a second light beam; and
   a light combining device, disposed on a transmission path of the first light beam and the second light beam, combining the first light beam of which the wavelength is not converted and the second light beam to generate an illumination beam.

9. The light source system of the projection device according to claim 8, wherein the laser light source comprises:
   a first light source module, coupled to the control circuit, and comprising a plurality of first light-emitting units; and
   a second light source module, coupled to the control circuit, and comprising a plurality of second light-emitting units, wherein the control circuit enables a portion of the plurality of first light-emitting units of the first light source module and a portion of the plurality of second light-emitting units of the second light source module to provide the light beam as the first light beam, when characteristic parameters of the plurality of first light-emitting units and the plurality of second light-emitting units providing the light beam do not reach the preset value, the control circuit disables the plurality of first light-emitting units and the plurality of second light-emitting units providing the light beam, and controls the remaining plurality of first light-emitting units and the remaining plurality of second light-emitting units to provide the back-up light beam as the first light beam.

10. The light source system of the projection device according to claim 8, wherein the laser light source comprises:
   a first light source module, coupled to the control circuit, and comprising a plurality of first light-emitting units; and
   a second light source module, coupled to the control circuit, and comprising a plurality of second light-emitting units, wherein the control circuit enables the plurality of first light-emitting units to provide the light beam as the first light beam, when characteristic parameters of the plurality of first light-emitting units providing the light beam do not reach the preset value, the control circuit disables the plurality of first light-emitting units, and enables the plurality of second light-emitting units to provide the back-up light beam as the first light beam.

11. The light source system of the projection device according to claim 8, wherein the number and position of light spots generated by the light beam as the first light beam incident into the light combining device are the same as the number and position of light spots generated by the back-up light beam as the first light beam incident into the light combining device.

12. The light source system of the projection device according to claim 8, wherein the control circuit determines whether characteristic parameters of the plurality of light-emitting units providing the first light beam reach the preset value according to a voltage or a current feedback signal from the plurality of light-emitting units providing the first light beam.

13. The light source system of the projection device according to claim 8, wherein the wavelength conversion device comprises a first region and a second region, the first region comprises a phosphor material, when the first region is irradiated by the first light beam, the phosphor material is adapted to convert the first light beam into the second light beam, and when the second region is irradiated by the first light beam, the first light beam passes through the second region, or the first light beam is reflected by the second region.

14. A projection method of a projection device, wherein a laser light source of the projection device comprises a plurality of light-emitting units, and the projection method of the projection device comprises:
   controlling a portion of the plurality of light-emitting units to provide a light beam as the first light beam;
   detecting whether characteristic parameters of the plurality of light-emitting units providing the light beam reach a preset value;
   when the characteristic parameters of the plurality of light-emitting units providing the light beam do not reach the preset value, disabling the plurality of light-emitting units providing the light beam, and controlling the remaining light-emitting units to provide a back-up light beam as the first light beam so as to substitute the disabled plurality of light-emitting units;
   converting a portion of the first light beam into a second light beam;
   combining the first light beam of which the wavelength is not converted and the second light beam to generate an illumination beam;
   converting the illumination beam into an image beam; and
   converting the image beam into a projection beam.

15. The projection method of the projection device according to claim 14, wherein the laser light source comprises a first light source module and a second light source module, the first light source module comprises a plurality of first light-emitting units, the second light source module comprises a plurality of second light-emitting units, and the projection method of the projection device comprises:
   enabling a portion of the plurality of first light-emitting units of the first light source module and a portion of the plurality of second light-emitting units of the second light source module to provide the light beam as the first light beam; and when characteristic parameters of the plurality of first light-emitting units and the plurality of second light-emitting units providing the light beam do not reach the preset value, disabling the plurality of first light-emitting units and the plurality of second light-emitting units providing the light beam, and controlling the remaining plurality of first light-emitting units and the remaining plurality of second light-emitting units to provide the back-up light beam as the first light beam.

16. The projection method of the projection device according to claim 14, wherein the laser light source comprises a first light source module and a second light source module, the first light source module comprises a plurality of first light-emitting units, the second light source module comprises a plurality of second light-emitting units, and the projection method of the projection device comprises:

enabling the plurality of first light-emitting units to provide the light beam as the first light beam; and when characteristic parameters of the plurality of first light-emitting units providing the light beam do not reach the preset value, disabling the plurality of first light-emitting units, and enabling the plurality of second light-emitting units to provide the back-up light beam as the first light beam.

17. The projection method of the projection device according to claim 14, wherein the number and position of light spots generated by the light beam as the first light beam are the same as the number and position of light spots generated by the back-up light beam as the first light beam.

18. The projection method of the projection device according to claim 14, comprising:

determining whether characteristic parameters of the plurality of light-emitting units providing the first light beam reach the preset value according to a voltage or a current feedback signal from the plurality of light-emitting units providing the first light beam.

19. The projection method of the projection device according to claim 14, comprising:

controlling the projection device to project and display a light source selection interface when characteristic parameters of the plurality of light-emitting units providing the light beam as the first light beam do not reach the preset value; and disabling the plurality of light-emitting units providing the light beam as the first light beam according to a light source selection command, and controlling the remaining light-emitting units to provide the back-up light beam as the first light beam.

* * * * *